(No Model.) 2 Sheets—Sheet 1.
G. G. GROSS.
CULTIVATOR.
No. 585,569. Patented June 29, 1897.
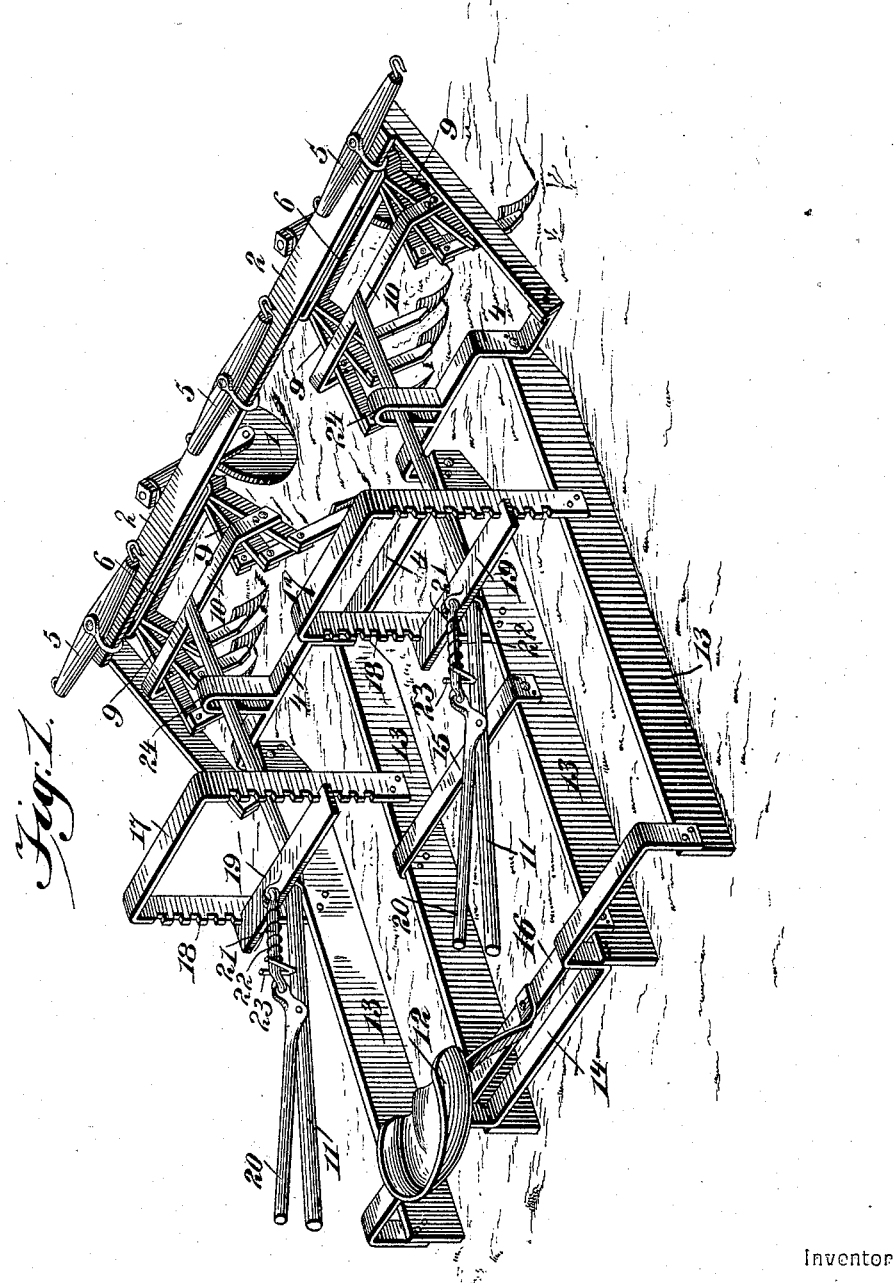
Witnesses
H. T. Dieterich
V. B. Hillyard
Inventor
Guthridge G. Gross
By his Attorneys,
C. A. Snow & Co.

(No Model.) 2 Sheets—Sheet 2.
G. G. GROSS.
CULTIVATOR.
No. 585,569. Patented June 29, 1897.
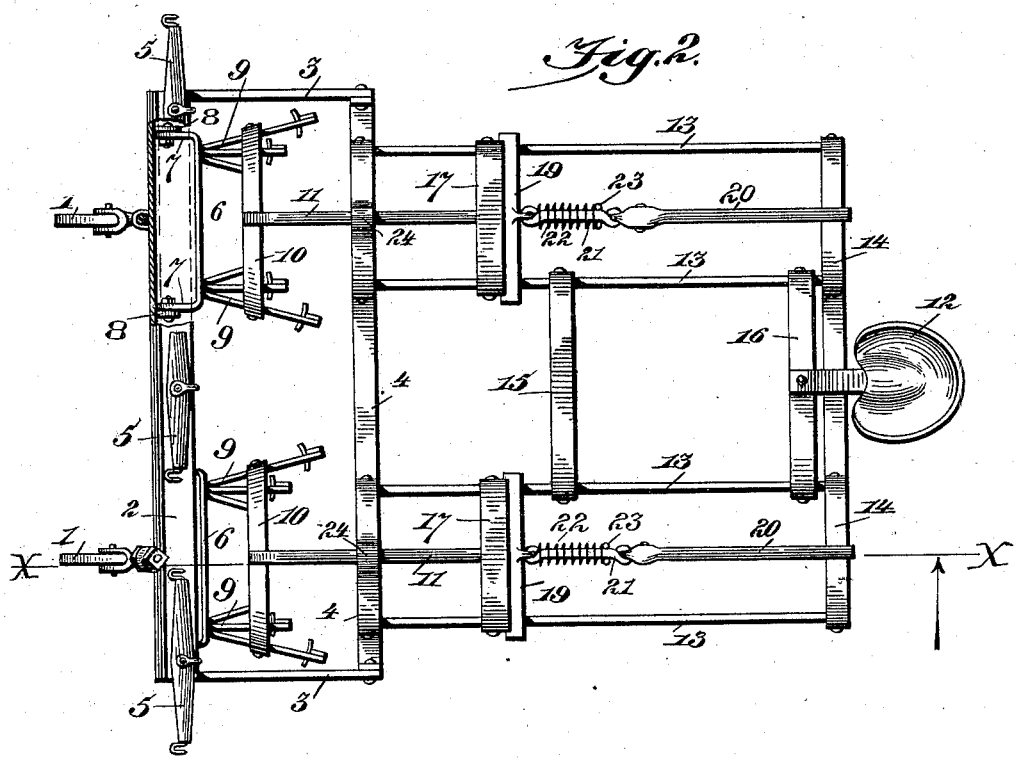
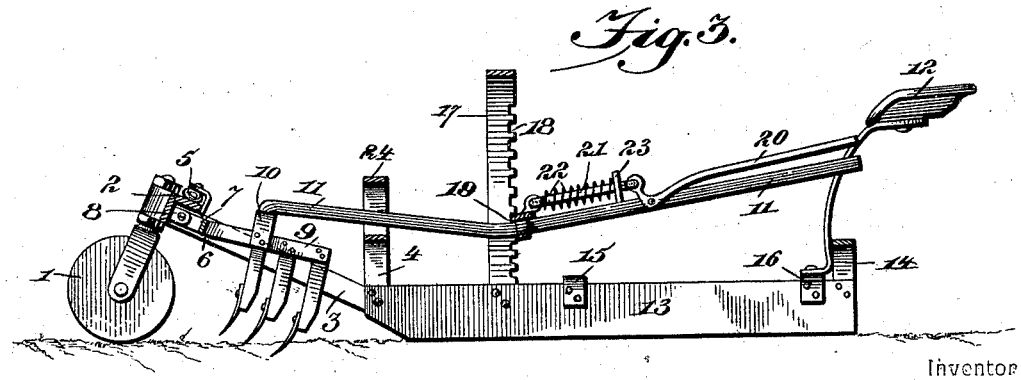
Witnesses
H. S. Dieterich
V. B. Hillyard
Inventor
Guthridge G. Gross
By his Attorneys,
C. A. Snow & Co.

UNITED STATES PATENT OFFICE.

GUTHRIDGE GASTON GROSS, OF CEDAR RAPIDS, NEBRASKA.

CULTIVATOR.

SPECIFICATION forming part of Letters Patent No. 585,569, dated June 29, 1897.

Application filed October 17, 1896. Serial No. 609,224. (No model.)

*To all whom it may concern:*

Be it known that I, GUTHRIDGE GASTON GROSS, a citizen of the United States, residing at Cedar Rapids, in the county of Boone and State of Nebraska, have invented a new and useful Cultivator, of which the following is a specification.

This invention relates to cultivators for bedding or listing and which may be used for work of any character or nature to which implements of this kind are generally applied.

Some of the advantages sought to be attained are an increased amount of work with a less number of horses, a lighter draft, ease with which the cultivator-shovels can be raised or lowered according to the required depth of cultivation, and to increase the durability and effectiveness of this class of implements and lessen the labor of the attendant, whereby the work is facilitated and all the parts rendered accessible for any purpose whatsoever.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a cultivator especially designed for attaining the objects of this invention. Fig. 2 is a top plan view thereof. Fig. 3 is a longitudinal section on the line X X of Fig. 2, looking in the direction of the arrow.

Corresponding and like parts are referred to in the following description and indicated in the several views of the accompanying drawings by the same reference-characters.

The implement comprises a cultivator-frame and a runner-frame rigidly connected, the cultivor-frame being supported at its front end upon caster or pilot wheels 1, which are attached to the transverse bar 2 in any ordinary manner. In order to secure lightness and strength, the transverse bar 2 is formed of angle-iron, and the longitudinal bars 3 are secured thereto at their front ends in any substantial manner and incline rearwardly and downwardly and have firm connection at their rear ends with the front bar 4 of the runner-frame. Singletrees 5 are applied to the transverse bar 2, and the team for drawing the implement over the field is hitched thereto, the middle horse walking between adjacent rows and the side horses walking exterior to the rows being cultivated. Bars 6 have their end portions 7 bent and pivotally connected to lugs 8, secured to or formed with the bar 2, so as to tilt vertically, and cultivator-gangs 9 are attached at their front ends to the bars 6 and are coupled in pairs by yokes 10, which are bars having their end portions bent and secured in any substantial manner to the outermost beams of the cultivator-gangs. A pair of cultivator-gangs is secured to each bar 6, and the beams of each gang gradually lengthen from the inner to the outer beams, whereby the cultivator-shovels appear in echelon form, substantially as shown. A handle 11 is rigidly attached at its front end to each yoke 10 and extends rearwardly within convenient reach of the driver's seat 12, whereby the gangs can be raised or lowered at will, according to the required depth of cultivation.

The runners 13 are provided in pairs and are connected at their front ends by the bar 4 and at their rear ends by a corresponding bar 14, the connecting-bars being arched at their ends and having the runners secured to the vertical portions of the arches. The pairs of runners are connected by cross-bars 15 and 16, the latter forming a support for the seat 12. An arch 17 connects the runners of each pair, and the rear edge of its vertical member is notched, as shown at 18, to be engaged by a latch-bar 19, by means of which the handle 11 is secured in the adjusted position. The latch-bars 19 are slidingly supported upon their respective handles and have connection with the hand-latches 20, pivoted to the handles by means of links 21, upon which are mounted springs 22 for holding the latch-bars in engagement with the notched arches, whereby the handles are secured in the located position. Lugs 23, secured to the handles 11, have the rear ends of the links 21 operating therethrough, and the springs 22 are confined between the lugs 23 and the front ends of the links, so as to be compressed when withdrawing the latch-bars from engagement with the arches, and which, when the hand-latches are released, move the latch-bars forward into engagement with the notches of the arches for the purpose mentioned. Guides 24 are provided on the arched portions of the transverse bar 4 to direct the handles in their vertical movements and prevent lateral displacement thereof, and these guides appear as loops and embrace the sides of the handles, so as to insure a proper movement of the handles when adjusting the cultivator-gangs and to guard against lateral movement of the handles and prevent disengagement of one end or the other of the latch-bars from the notched members of the arches.

The caster-wheels support the front end of the cultivator-frame and the runners support the weight of the driver and cause the implement to run steady and uniformly. The upward inclination of the side bars 3 enables the front end of the cultivator-gangs to be elevated sufficiently so that by moving the rear ends of the gangs vertically the required adjustment can be attained to cause the shovels to enter the ground to a greater or less depth, according to the character of the ground or the nature of the work in hand.

Having thus described the invention, what is claimed as new is—

1. A cultivator comprising a runner-frame, a cultivator-frame having its front transverse bar elevated and its side bars inclining rearwardly and downwardly and secured to the runner-frame, caster-wheels supporting the front end of the cultivator-frame, means for applying or hitching the team to the front bar of the cultivator-frame, cultivator-gangs connected to the said front bar, and means under the control of the driver for adjusting the cultivator-gangs, substantially in the manner set forth for the purpose described.

2. In a cultivator, the combination of a frame, a bar having its ends bent and pivotally connected to the frame, cultivator-gangs attached at their front ends to the said bar, a yoke spanning and connecting the said cultivator-gangs, a handle secured to the yoke and extending within convenient reach of the driver for adjusting the cultivator-gangs, and means for securing the handle in an adjusted position, substantially as set forth.

3. In a cultivator, the combination of a frame, a cultivator-gang having pivotal connection with the frame, runners, an arch connecting the runners and having its rear edge notched, a handle having connection with the cultivator-gang, a latch-bar slidingly mounted upon the handle and adapted to engage with the notched members of the arch, and means for operating the latch-bar, substantially as and for the purpose set forth.

4. In a cultivator, the combination of a frame, a pair of cultivator-gangs having pivotal connection with the frame, a yoke connecting the said pair of cultivator-gangs, a handle secured to the said yoke, a guide for directing the handle in its movements, runners, an arch connecting the runners and having its rear edge notched, a latch-bar slidingly mounted upon the handle and adapted to engage with the notched members of the arch, and means for operating the latch-bar, substantially as and for the purpose set forth.

5. The herein-described cultivator, comprising cultivator and runner frames, the side bars of the cultivator-frame inclining rearwardly and downwardly and the front and rear bars of the runner-frame having arched portions, caster-wheels and draft-attaching devices applied to the front bar of the cultivator-frame, bars having their end portions bent and pivoted to the front bar of the cultivator-frame, cultivator-gangs provided in pairs and secured to the pivoted bars, yokes connecting the pairs of cultivator-gangs, handles attached to the yokes and extending within convenient reach of the driver's seat, latch-bars slidingly mounted upon the handles, hand-latches for operating the latch-bars, runners secured to the arched portions of the front and rear bars of the runner-frame, guides applied to the arched portions of the front bar, arches having connection with the runners and having their rear edges notched to receive the latch-bars, and intermediate bars connecting the runners, substantially as shown and described.

In testimony that I claim the foregoing as my own I have hereto affixed my signature in the presence of two witnesses.

GUTHRIDGE GASTON GROSS.

Witnesses:
M. O. CALLENDER,
L. S. NIECE.